United States Patent [19]

Schreckenberg et al.

[11] 4,216,298
[45] Aug. 5, 1980

[54] PROCESS FOR THE PREPARATION OF CARBONIC ACID BIS-DIPHENOL ESTERS OF POLYESTER-DIOLS AND THEIR USE FOR THE PREPARATION OF HIGH-MOLECULAR SEGMENTED POLYESTER/POLYCARBONATES WHICH CAN BE PROCESSED AS THERMOPLASTICS

[75] Inventors: Manfred Schreckenberg; Dieter Freitag, both of Krefeld; Christian Lindner, Cologne; Carlhans Süling; Herbert Bartl, both of Odenthal; Klaus König, Leverkusen, all of Fed. Rep. of Germany

[73] Assignee: Bayer Aktiengesellschaft, Leverkusen, Fed. Rep. of Germany

[21] Appl. No.: 909,321

[22] Filed: May 24, 1978

Related U.S. Application Data

[63] Continuation-in-part of Ser. No. 845,174, Oct. 25, 1977.

[30] Foreign Application Priority Data

Nov. 12, 1976 [DE] Fed. Rep. of Germany ....... 2651639
Jun. 10, 1977 [DE] Fed. Rep. of Germany ....... 2726376

[51] Int. Cl.² .................. C08G 63/76; C08L 67/02; C08L 69/00; C08F 283/02
[52] U.S. Cl. ............................. 525/439; 260/463; 525/469; 528/171; 528/176; 528/179; 528/180
[58] Field of Search ............... 260/463; 525/439, 469; 528/176, 179, 180, 171

[56] References Cited

U.S. PATENT DOCUMENTS

| | | | |
|---|---|---|---|
| 3,030,331 | 4/1962 | Goldberg | 260/860 |
| 3,030,335 | 4/1962 | Goldberg | 528/85 |
| 3,161,615 | 12/1964 | Goldberg | 528/204 |
| 3,169,121 | 2/1965 | Goldberg | 528/173 |
| 3,207,814 | 9/1965 | Goldberg | 260/860 |
| 3,220,976 | 11/1965 | Goldberg | 528/148 |
| 3,287,442 | 11/1966 | Caldwell et al. | 260/858 |
| 3,290,409 | 12/1966 | Munro | 260/860 |
| 3,449,467 | 6/1969 | Wynstra | 260/850 |
| 3,461,187 | 8/1969 | Cantrill | 260/873 |
| 3,549,682 | 12/1970 | Vernaleken et al. | 260/463 |
| 3,553,167 | 1/1971 | Schnell et al. | 528/176 |
| 3,641,200 | 2/1972 | Matzner | 260/860 |
| 3,714,125 | 1/1973 | Shima et al. | 525/437 |
| 3,843,708 | 10/1974 | Matzner | 260/463 |
| 3,843,752 | 10/1974 | Katayama et al. | 260/873 |
| 4,105,633 | 8/1978 | Swart et al. | 260/463 X |

FOREIGN PATENT DOCUMENTS

| | | |
|---|---|---|
| 1964998 | 7/1977 | Fed. Rep. of Germany . |
| 2235965 | 6/1973 | France . |
| 898775 | 6/1962 | United Kingdom . |
| 954500 | 4/1964 | United Kingdom . |
| 965085 | 7/1964 | United Kingdom . |
| 1074204 | 6/1967 | United Kingdom . |
| 1139413 | 1/1969 | United Kingdom . |
| 1190303 | 5/1970 | United Kingdom . |
| 1270077 | 4/1972 | United Kingdom . |
| 1422676 | 1/1976 | United Kingdom . |

OTHER PUBLICATIONS

Merrill, Stewart H., Journal of Polymer Science, vol. 55, (1961) pp. 343-352.
Goldberg, Eugene P., Journal of Polymer Science:Part C, No. 4, (1962), pp. 707-730.
Merrill, Stewart H. et al., Journal of Polymer Science:Part A, vol. 3 (1965) pp. 2189-2203.

*Primary Examiner*—Lucille M. Phynes
*Attorney, Agent, or Firm*—Gene Harsh; Lawrence S. Pope

[57] ABSTRACT

The present invention relates to the transesterification of the carbonic acid aryl esters prepared according to German Published Patent Specification 2,651,639 (which corresponds to U.S. Patent application Ser. No. 854,174, filed Oct. 25, 1977) with an excess of diphenol for the preparation of polyester-diol bis-diphenol carbonate. The present invention further relates to the polyester-diol bis-diphenol carbonates obtained according to the invention and their use for the preparation of polyester/polycarbonates and to the polyester/polycarbonates so prepared.

37 Claims, No Drawings

PROCESS FOR THE PREPARATION OF CARBONIC ACID BIS-DIPHENOL ESTERS OF POLYESTER-DIOLS AND THEIR USE FOR THE PREPARATION OF HIGH-MOLECULAR SEGMENTED POLYESTER/POLYCARBONATES WHICH CAN BE PROCESSED AS THERMOPLASTICS

This application is a continuation-in-part of copending U.S. application Ser. No. 845,174, filed Oct. 25, 1977.

BACKGROUND OF THE INVENTION

German Published Patent Specification 2,651,639, (U.S. Patent application Ser. No. 845,174), claims a process for the preparation of carbonic acid aryl esters of polyester-polyols from polyester-polyols with an average molecular weight ($\overline{Mn}$) above about 250, preferably above about 600, and carbonic acid bis-aryl esters, comprising heating the polyester-polyols with the carbonic acid bis-aryl esters at temperatures between about 100° C. and 200° C., in vacuo below about 35 mm Hg in the presence of catalysts, more than one mol of carbonic acid bis-aryl ester being employed per OH group, and distilling off the hydroxyaryl compound formed and the excess carbonic acid bis-aryl ester.

Suitable polyester-polyols are, in particular, reaction products of polyhydric, preferably dihydric and optionally also trihydric, alcohols with polybasic, preferably dibasic, carboxylic acids.

SUMMARY OF THE INVENTION

The present invention relates to a process for the preparation of polyester diol bis-diphenol carbonates characterized in that polyester-diol bis-aryl carbonates, prepared according to German Published Patent Specification 2,651,639 by heating polyester-diols with molecular weights $\overline{Mn}$ (number-average) above about 250, preferably above about 600, with carbonic acid bis-aryl esters at temperatures between about 100° C. and 200° C., preferably between about 110° C. and 180° C., in vacuo below about 35 mm Hg, preferably between about 25 mm Hg and 1 mm Hg, in the presence of catalysts, more than one mol of carbonic acid bis-aryl ester, preferably between about 1.1 mols and 2.25 mols of carbonic acid bis-aryl ester, being employed per OH group of the polyester-diol, and by distilling off the compound formed and the excess carbonic acid bis-aryl ester, are reacted with diphenols at temperatures between about 100° C. and 200° C., preferably between about 110° C. and 180° C., in vacuo below about 35 mm Hg, preferably between about 25 mm Hg and 0.1 mm Hg, in the presence of catalysts, wherein more than 1 mol of diphenol, preferably between about 1.1 mols and 2 mols of diphenol, is employed per mol of carbonic acid aryl ester groups of the polyester-diol bis-aryl carbonate, and the resulting hydroxyaryl compound formed is distilled off.

The invention also relates to polyester-diol bis-diphenol carbonates prepared by the above mentioned process and their use for the preparation of polyester-/polycarbonates and the polyester/polycarbonates so prepared.

The trans-esterification of the polyester-diol bis-aryl carbonates prepared according to German Published Patent Specification 2,651,639 with excess diphenols to give the corresponding polyester-diol bis-diphenol carbonates takes place surprisingly smoothly and without side reactions, even at reaction temperatures of up to 200° C. Moreover, the molecular distribution given by the starting materials is not changed, polyester-polyols are not re-formed and polycondensation to polycarbonates does not take place.

DETAILED DESCRIPTION OF THE INVENTION

A. Preparation of the polyester-diol bis-aryl carbonates

The polyester-diol bis-aryl carbonates necessary for the preparation, according to the invention, of polyester-diol bis-diphenol carbonates are prepared according to German Published Patent Specification 2,651,639.

German Published Patent Specification 2,651,639 relates to a process for the preparation of carbonic acid aryl esters of polyester-polyols with an $\overline{Mn}$ about above 250, preferably above about 600, and carbonic acid bis-aryl esters, characterized in that polyester-polyols with molecular weights $\overline{Mn}$ (number-average) above about 250, preferably above about 600, are heated with carbonic acid bis-aryl esters at temperatures between about 100° C. and 200° C., preferably between about 100° C. and 180° C., in vacuo below about 35 mm Hg, preferably between about 25 and 0.1 mm Hg, in the presence of catalysts, more than one mol of carbonic acid-aryl ester, preferably between about 1.25 mols and 2.25 mols of carbonic acid bis-aryl ester, being employed per OH group of the polyester-polyol, and the hydroxyaryl compound formed and the excess carbonic acid bis-aryl ester are distilled off.

German Published Patent Specification 2,651,639 further relates to the carbonic acid esters of polyester-polyols produced by this process.

Polyester-polyols which are particularly preferred according to the invention are polyester-diols.

The polyester-polyols used in the practice of the invention are, for example, reaction products of polyhydric, preferably dihydric and optionally also trihydric alcohols with polybasic, preferably dibasic, carboxylic acids. Instead of the free polycarboxylic acids, the corresponding polycarboxylic acid anhydrides or corresponding polycarboxylic acid esters of lower alcohols or their mixtures can also be used for the preparation of the polyester-polyols. The polycarboxylic acids can be of an aliphatic, cycloaliphatic, aromatic and/or heterocyclic nature and can be optionally substituted, for example, by halogen atoms, and/or unsaturated. Examples of these are: oxalic acid, malonic acid, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric and trimeric fatty acids, such as oleic acid, optionally in a mixture with monomeric fatty acids. Possible polyhydric alcohols are, optionally in a mixture with one another, for example, ethylene glycol, propylene 1,2- and 1,3-glycol, butylene 1,4- and 2,3-glycol, hexane-1,6-diol, octane-1,8-diol, neopentylglycol, cyclohexanedimethanol (1,4-bishydroxymethylcyclohexane), 2-methyl-1,3-propanediol, glycerol, trimethylolpropane, hexane-1,2,6-triol, butane-1,2,4-triol, trimethylolethane, pentaerythritol and quinitol, and also thiodiglycol, diethylene glycol, triethylene glycol, tetraethylene glycol, poly-ethylene glycols, dipropylene glycol, polypropylene glycols, dibutylene glycol and polybutylene glycols.

The content of terminal hydroxyl groups and thus the "average" molecular weight $\overline{M}n$ is determined by choosing the defined excess of alcohol. Polyesters from aliphatic starting components are preferably employed.

Further, polyester-polyols are, for example, also those which are prepared by polymerization of a lactone, for example, of ε-caprolactone or by a condensation reaction of a hydroxycarboxylic acid, for example, of ω-hydroxycaproic acid, and a starting compound containing hydroxyl groups. $\overline{M}n$ is determined as described above.

The polyester-polyols which are suitable for the process according to the invention preferably have 2 to 4 hydroxyl groups, and particularly preferably 2 hydroxyl groups.

Carbonic acid bis-aryl esters used are, in particular, those of the formula I:

wherein
Ar is a substituted or unsubstituted aryl radical with 6 to 18 C atoms.

Possible substituents are, in particular, $C_1$–$C_4$-alkyls as well as nitro and halogen, such as, for example, chlorine or bromine. Examples of the esters are diphenyl carbonate, alkyl-substituted diphenyl carbonates, such as the di-toluyl carbonates, halogen-substituted diphenyl carbonates, such as the dichlorophenyl carbonates, dinaphthyl carbonate and alkyl-substituted and halogen-substituted dinaphthyl carbonates; in these, the nitro, alkyl or halogen substituents on the two phenyl nuclei or, respectively, the two naphthyl nuclei, of the diaryl carbonates can be identical or non-identical and can be symmetrical or unsymmetrical to one another. Thus, for example, phenyl toluyl carbonate, phenyl chlorophenyl carbonate, 2-toluyl-4-toluyl carbonate or 4-toluyl-4-chlorophenyl carbonate are also suitable for the process according to the invention.

Polyester bis-aryl carbonate are thus, in particular, those of the simplified formula II

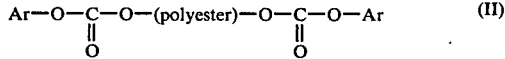

wherein
Ar has the meaning given above, and
-(polyester)- is the divalent radical of one of the polyester-diols described above.

Suitable catalysts for the process according to the invention are basic transesterification catalysts, such as, for example, alkali metal phenolates or alkaline earth metal phenolates, alkali metal alcoholates or alkaline earth metal alcoholates and tertiary amines, such as, for example, triethylenediamine, morpholine, pyrrolidine, pyridine and triethylamine, or metal compounds, such as antimony trioxide, zinc chloride, titanium tetrachloride and titanic acid tetrabutyl ester.

The catalyst is used in amounts between about 10 ppm and 300 ppm, relative to the total weight of polyester-polyol and carbonic acid bis-aryl ester employed.

The catalyst may even be employed in amounts less than these when the starting compounds contain no basic impurities, if acid catalysts are used, and contain no acid impurities, if basic catalysts are used. So as to produce as little intrinsic color as possible in the carbonic acid esters, prepared according to the process of the present invention, as little as possible catalyst should be used.

The process according to the invention is preferably carried out in bulk, that is to say in the absence of solvents. However, solvents which are inert under the reaction conditions can also optionally be used, such as aliphatic hydrocarbons or aromatic hydrocarbons, which can contain, for example, nitro groups.

The reaction time depends on the reaction temperature and the nature and amount of catalyst used and is usually about ½ to 24 hours.

The hydroxyaryl compounds formed during the process and the excess carbonic acid bis-aryl esters can be removed after the reaction has ended by, in the case of a discontinuous process, separating off the hydroxyaryl compounds during the reaction by distillation and, after the reaction has ended, distilling off unreacted amounts of diaryl carbonate. If the transesterification reaction is carried out by a continuous procedure, the hydroxyaryl compounds are separated off from the reaction mixture by fractional distillation.

According to a particularly preferred embodiment of the process, the reaction is carried out with sodium phenolate as the catalyst, using a mixture of polyester-diol and carbonic acid bis-aryl ester in the molar ratio of hydroxy group to carbonic acid bis-aryl ester of about 1:2 at about 150° C.

The average molecular weights given in the examples below are number average $\overline{M}n$ and are obtained by determining the OH number.

The Staudinger index [η] given in the examples was measured in THF at 25° C. and is indicated in dl/g.

For the definition of the Staudinger index see: H. G. Elias: "Makromoleküle" ("Macromolecules"), Hüthig & Wepf-Verlag Basle, page 265.

EXAMPLES

EXAMPLE 1

800 parts by weight of a polyester-diol of n-hexane-1,6-diol and adipic acid of average molecular weight $\overline{M}n=800$, 856 parts by weight of diphenyl carbonate and 0.05 part by weight of sodium phenolate are heated to 150° C. for 3.5 hours at 15 mm Hg while stirring and under nitrogen; 187 parts by weight of phenol are distilled off during this time. The excess diphenyl carbonate is then removed in a thin film evaporator at 200° C./0.1 mm Hg. A colorless, viscous oil is obtained.
[η] THF=0.072
OH number=0
C: found 63.3%; calculated: 66.5%
H: found 8.3%; calculated: 8.2%.

EXAMPLE 2

800 parts by weight of a polyester-diol of n-hexane-1,6-diol and adipic acid of average molecular weight $\overline{M}n=800$, 750 parts by weight of diphenyl carbonate and 0.1 part by weight of antimony trioxide are heated to 170° C. for 4.5 hours under 15 mm Hg, while stirring and under nitrogen, and 188 parts by weight of phenol are distilled off during this time. Excess diphenyl carbonate can then be removed analogously to Example 1. A colorless, viscous oil is obtained which is identical to the product prepared in Example 1.

EXAMPLE 3

1,000 parts by weight of a polyester-diol of adipic acid and equal molar amounts of ethylene glycol and butane-1,4-diol of average molecular wieght $\overline{M}n=1,900$, 385 parts by weight of diphenyl carbonate and 0.1 part by weight of sodium phenolate are heated to 150° C. for 4.5 hours under 12 mm Hg, while stirring and under nitrogen; 100 parts by weight of phenol are distilled off during this time. The excess diphenyl carbonate is then removed in a thin layer evaporator at 200° C./0.1 mm Hg. A colorless, viscous oil is obtained.

[$\eta$] THF=0.112
OH number=0
C: found. 54.8%; calculated. 55.0%
H: found. 7.5%; calculated. 7.6%.

EXAMPLE 4

1,000 parts by weight of a polyester-diol of adipic acid and a mixture of n-hexane-1,6-diol/neopentyl-glycol in a molar ratio of 65/35 of average molecular weight $\overline{M}n=1,828$, 385 parts by weight of diphenyl carbonate and 0.12 part by weight of sodium phenolate are heated at 160° C. for 5 hours, under 12 mm Hg, while stirring and under nitrogen; 101 parts by weight of phenol are distilled off during this time. The excess diphenyl carbonate is then removed in a thin film evaporator at 200° C./0.1 mm Hg. A viscous oil is obtained.

[$\eta$] THF=0.118
OH number=0
C: found. 58.1%; calculated. 58.3%
H: found. 7.6%; calculated. 7.7%.

B. Preparation of the Polyester-diol bis-diphenol carbonates

In particular, the polyester diol bis-aryl carbonates prepared according to German Published Patent Specification 2,651,639.2 from polyester-diols and carbonic acid bis-aryl esters of the formula I

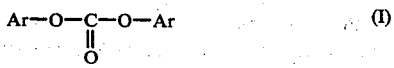

wherein
Ar is a substituted or unsubstituted aryl radical with 6 to 18 C atoms, preferably phenyl,
and which are of the simplified formula II

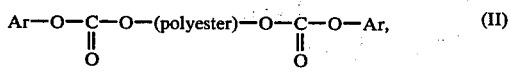

wherein
-(polyester)- represents the bivalent radical of a polyester-diol, and
Ar has the meaning given for the formula I,
are reacted with diphenols to produce polyester-diol bis-diphenol carbonates.

In practice, in particular with respect to the conversion of the polyester-diol bis-diphenol carbonates into polyester/polycarbonates, the polyester-diol bis-aryl carbonates can be reacted with the diphenols together with the excess carbonic acid bis-aryl esters in each case, that is to say without distilling them off, to give the polyester-diol bis-diphenol carbonates.

During this reaction, the carbonic acid bis-aryl esters which have not been previously distilled off are reacted with the diphenols to give monomeric or oligomeric carbonates, containing OH groups, of the diphenols.

Suitable diphenols for the preparation, according to the invention, of polyester-diol bis-diphenol carbonates are: hydroquinone, resorcinol, dihydroxy-diphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and α,α-bis-(hydroxyphenyl)diisopropylbenzenes, as well as their nuclear-alkylated and nuclear-halogenated compounds. These and further suitable aromatic dihydroxy compounds are listed, for example, in U.S. Pat. Nos. 3,028,365, 2,999,835, 3,148,172, 3,271,368, 2,991,273, 3,271,367, 3,280,078, 3,014,891 and 2,999,846 and German Patent Specifications 2,063,050 and 2,211,957.

Examples of suitable diphenols are bis-(4-hydroxyphenyl)-methane, 4,4'-dihydroxydiphenyl, 2,4-bis-(4-hydroxyphenyl)-2-methylbutane, α,α-bis-(4-hydroxyphenyl)-p-diisopropylbenzene, 2,2-bis-(3-chloro-4-hydroxyphenyl)-propane and 2,2-bis-(3,5-dimethyl-4-hydroxyphenyl)-propane.

Preferred diphenols are, for example, 2,2-bis-(4-hydroxyphenyl)-propane, 1,1-bis-(4-hydroxyphenyl)-cyclohexane, 2,2-bis-(3,5-dichloro-4-hydroxyphenyl)-propane and 2,2-bis-(3,5-dibromo-4-hydroxyphenyl)-propane.

One or several of the diphenols suitable according to the invention can be employed.

Suitable catalysts for the preparation, according to the invention, of polyester-diol bis-diphenol carbonates are basic transesterification catalysts, such as alkali metal phenolates or alkaline earth metal phenolates, alkali metal alcoholates or alkaline earth metal alcoholates, tertiary amines, such as, for example, triethylene-diamine, morpholine, pyrrolidine, triethylamine and tributylamine, and pyridine or metal compounds, such as, for example, antimony trioxide, zinc chloride, titanium tetrachloride and titanium tetrabutyl ester.

The catalyst is used in amounts of between about 10 ppm and 200 ppm, relative to the total weight of the particular polyester-diol bis-aryl carbonate employed and of the particular diphenol employed.

Less than these amounts of catalyst can also optionally be employed if the starting materials contain no basic impurities when acid catalysts are used and contain no acid impurities when basic catalysts are used. Amounts of catalyst which are as low as possible are to be preferred, in the interest of as slight an intrinsic color as possible in the products according to the invention.

The process, according to the invention, for the preparation of polyester-diol bis-diphenol carbonates is preferably carried out in bulk, that is to say in the absence of solvents. However, solvents which are inert under the reaction conditions such as, for example, aliphatic hydrocarbons or aromatic hydrocarbons, which can be unsubstituted or substituted, for example, by nitro groups, can optionally be used.

The reaction time for the transesterification process for the preparation of polyester-diol bis-diphenol carbonates is between about ½ and about 24 hours, depending on the reaction temperature and on the nature and amount of the catalyst.

Polyester-diol bis-diphenol carbonates are prepared, for example, by heating a mixture of a polyester-diol bis-carbonic acid monoaryl ester obtained according to German Published Patent Specification 2,651,639, a diphenol and a catalyst to temperatures between about 100° C. and about 200° C., preferably between about 110° C. and 180° C., in vacuo and distilling-off out of the reactor the phenol formed as the reaction progresses. In this procedure, the diphenol is employed in excess, more than one mol of diphenol being used per carbonic acid phenyl ester group of the polyester-diol bis-carbonic acid monoaryl ester, preferably between about 1.1 mols and about 2 mols of diphenol being used. According to a particularly preferred embodiment, the reaction of a polyester-diol bis-carbonic acid monoaryl ester and bisphenol A in the molar ratio bis-carbonic acid monoaryl ester to bisphenol A of 1:3 is reacted, using the disodium phenolate of bisphenol A as the catalyst, at 150° C. in vacuo between 25 and 0.1 mm Hg.

In particular, according to the invention, polyester-diol bis-carbonic acid monoaryl esters are reacted with the diphenols of the following formula III

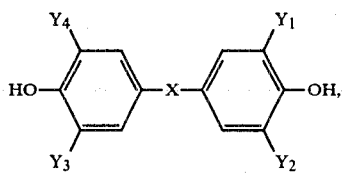
(III)

wherein
X denotes —CH$_2$—,

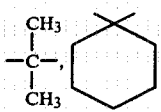

O, S or SO$_2$ and
Y$_1$ to Y$_4$ are identical or different and denote hydrogen or halogen, such as, for example, chlorine or bromine,
to give the polyester-diol bis-diphenol carbonates of the simplified formula IV

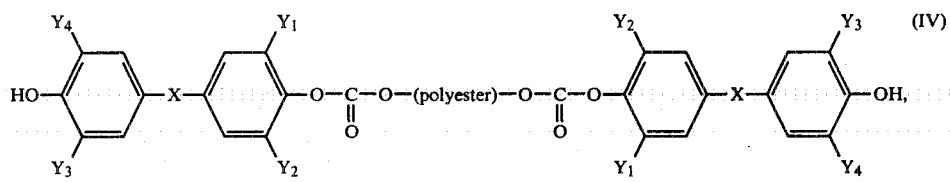
(IV)

wherein
-(polyester)- represents the bivalent radical of a polyester-diol,
X denotes —CH$_2$—,

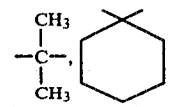

O, S or SO$_2$, and
Y$_1$ to Y$_4$ are identical or different and denote hydrogen or halogen, such as, for example, chlorine or bromine.

Polyester-diol bis-diphenol carbonates according to the invention are thus, for example, those of the formulae IVa–IVh:

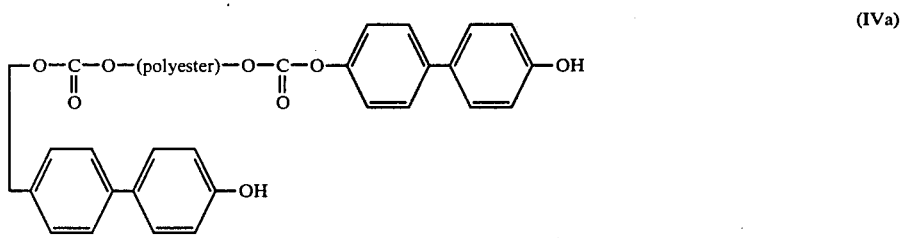
(IVa)

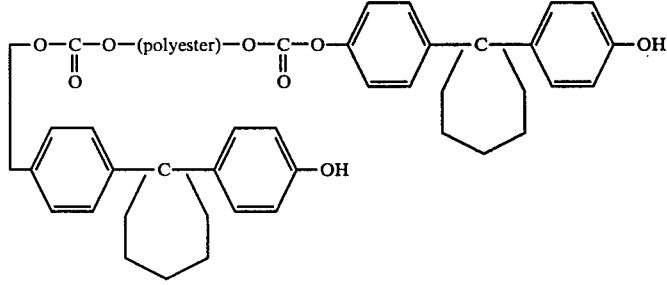
(IVb)

 (IVc)
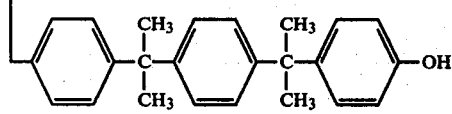
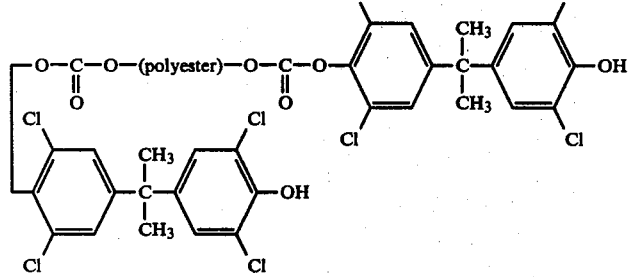 (IVd)
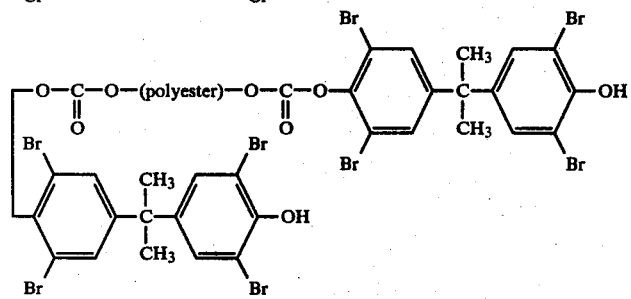 (IVe)
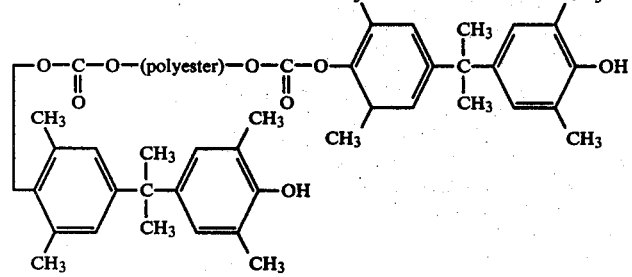 (IVf)
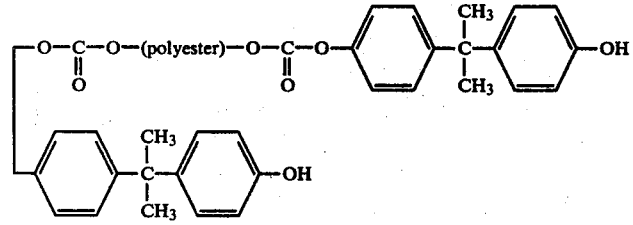 (IVg)
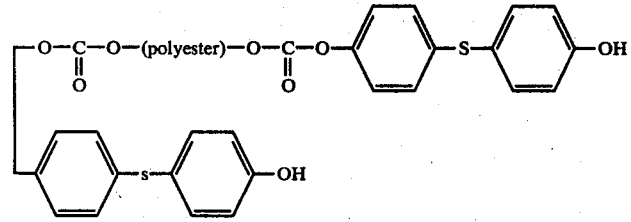 (IVh)
wherein
-(polyester)- is the bivalent radical in the formulae IVa–IVh of the polyester-diols described hereinabove.
C. Process for the Preparation of Polyester/Polycarbonates.
The polyester-diol bis-diphenol carbonates according to the invention can be used as starting bis-phenols in the preparation of polycarbonates by the known two-phase interface polycondensation process. Polyester/polycarbonates of a certain structure are thus obtained.

The process, according to the invention, for the preparation of these polyester/polycarbonates is characterized in that the polyester-diol bis-diphenol carbonates according to the invention, in particular those of the formula IV, are reacted with other diphenols, in particular with those of the formula III, and with phosgene by the two-phase interface polycondensation process, known for the preparation of polycarbonates, at pH values between about 9 and 14 and temperatures between about 0° C. and 80° C., preferably between about 15° C. and 40° C. The polyester/polycarbonates obtained according to the invention are characterized by the presence of an amorphous (elastomeric) polyester phase and a crystalline (hard) polycarbonate phase or an amorphous/crystalline (hard) polycarbonate phase.

From a morphological point of view, the polyester/polycarbonates have two different, spatially separate phases, that is to say regions which are composed of a continuous amorphous polyester phase and regions which are composed of a crystalline or amorphous/crystalline polycarbonate phase.

Because they are multi-phase, the polyester/polycarbonates according to the invention have a higher heat distortion point than comparable single-phase polyester/polycarbonates.

Single-phase polyester/polycarbonates are described, for example, in U.S. Pat. No. 3,151,615. They are obtainable by various processes, but preferably by the "pyridine" process known from the preparation of polycarbonates.

The preparation of two-phase polymers, for example of polycarbonate/polycaprolactones, has hitherto only been achieved by means of bis-chloroformates of polycaprolactones and polycarbonate oligomers (see French Pat. No. 2,235,965). This is also correspondingly true for the polyester/polycarbonates of German Patent Specification 1,162,559, although these are not identified as two-phase.

The use, according to the invention, of polyesterdiol bis-diphenol carbonates has, compared with the use of corresponding bis-chloro-formates, the advantage of being insensitive towards hydrolysis and thus having a better storability, and of having clearly bifunctional reactivity.

In particular, because of their crystalline polycarbonate phase, the polyester/polycarbonates according to the invention have a higher heat distortion point.

It is possible to detect the different phases of the polyester/polycarbonates according to the invention with the aid of differential thermoanalysis, in which, for example, the polyester phase has a transformation temperature <20° C., the amorphous constituent in the polycarbonate phase has a transformation temperature between about 100° C. and 150° C. and the crystalline constituent of the polycarbonate phase has a crystallite melting point between about 170° C. and 250° C.

In addition to their particular capacity for exposure to heat, the high-molecular, segmented polyester/polycarbonates, which can be processed as thermoplastics, prepared by the process according to the invention exhibit good transparency, highly elastic properties and an outstanding elongation at break of >400%.

Diphenols which are suitable for the preparation, according to the invention, of the polyester/polycarbonates from the polyester-diol bis-diphenol carbonates according to the invention, are those which have already been mentioned for the preparation of polyester-diol bis-diphenol carbonates, in particular those of the formula III of this Patent Application; for example 4,4'-dihydroxy-diphenyl, bis-(4-hydroxyphenyl)-methane, 2,4-bis-(4-hydroxyphenyl)-2-methyl-butane, α,α-bis-(4-hydroxyphenyl)-p-diisopropylbenzene, 2,2-bis-(3-chloro-4-hydroxyphenyl)-propane, bis-(hydroxyphenyl) sulphide and 2,2-bis-(3,5-dimethyl-4-hydroxyphenyl)-propane are suitable.

2,2-Bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane are preferably used as other diphenols for the preparation, according to the invention, of the polyester/polycarbonates. Any desired mixtures of these other diphenols can also be employed.

Branched products with better flow properties during processing are obtained by incorporating small amounts of trifunctional or more than trifunctional compounds, in particular those with three or more than three phenolic hydroxyl groups, preferably between about 0.05 and about 2 mol % (relative to the diphenols employed).

Examples of suitable trifunctional or more than trifunctional compound are: phloroglucinol, 4,6-dimethyl-2,4,6-tri-(3-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(3-hydroxyphenyl)-ethane, tri-(4-hydroxyphenyl)phenylmethane, 2,2-bis-[4,4-(4,4'-dihydroxydiphenyl)cyclohexyl]-propane, 2,4-bis-(4-hydroxyphenyl-isopropyl)-phenol, 2,6-bis-(2'-hydroxy-5'-methylbenzyl)-4-methyl-phenol, 2,4-dihydroxybenzoic acid, 2-(4-hydroxyphenyl)-2-(2,4-dihydroxyphenyl)-propane, 1,4-bis-(4,4''-dihydroxytriphenyl-methyl)benzene and 3,3-bis-(4-hydroxyphenyl)-2-oxo-2,3-dihydroindole as well as 3,3-bis-(3-methyl-4-hydroxyphenyl)-2-oxo-2,3-dihydroindole.

The polyester/polycarbonates according to the invention can also be branched via the polyester component, and in particular by reacting the polyester-polyol bis-carbonic acid monoaryl esters obtainable according to German Published Patent Specification 2,651,639 and which have three or four aryl carbonate groups, with the above mentioned diphenols, triphenols and/or tetraphenols by the process of the present invention to give corresponding polyester-polyol poly(polyphenol carbonates), and co-using the resulting polyphenols in the polyester/polycarbonate synthesis according to the present invention in molar amounts of up to about 50 mol %, relative to mols of polyester-diol bis-diphenol carbonates employed.

The chain length of the polyester/polycarbonates can be adjusted by adding a chain stopper, for example a monofunctional phenol, such as phenol, 2,6-dimethyl-phenol, p-bromophenol or p-tert.-butylphenol, it being possible to use between about 0.1 and about 10 mol % of chain stopper per mol of diphenol employed.

The chain length of the polyester/polycarbonates can optionally be adjusted, for example, by adding polyester-monool mono-diphenol carbonates in molar amounts of up to about 50 mol %, respectively to mols of polyesterdiol bis-diphenol carbonates employed.

The high-molecular, segmented polyester/polycarbonates which can be processed as thermoplastics are prepared by the two-phase interface polycondensation process. For this, one of the other diphenols mentioned above or mixtures of the other diphenols mentioned above are dissolved in an alkaline aqueous solution. The polyesterdiol bis-diphenol carbonates according to the invention, in particular those of the formula IV, or their mixtures are likewise dissolved in a water-immiscible inert organic solvent and this solution is added. Phosgene is then passed into the mixture at a temperature between about 0° C. and 80° C., preferably between about 15° C. and 40° C., and at a pH value between about 9 and 14. The amount of phosgene depends on the diphenol employed, the cooling effect and the reaction temperature, and is in general about 1.1–3.0 mols of phosgene per mol of diphenol. After the phosgenation, the polycondensation is carried out by adding about 0.2–10 mol % of the tertiary aliphatic amine, relative to mols of diphenol. In this procedure, phosgenation times of between about 5 minutes and 90 minutes are required and polycondensation times of between about 3 minutes and 3 hours are required.

The present invention thus relates to the preparation of polyester/polycarbonates, which is characterized in that the polyester-diol bis-diphenol carbonates according to the invention, in particular those of the formula IV, are reacted with other diphenols, in particular those of the formula III, and with phosgene in a liquid mixture consisting of an inert organic solvent and an alkaline aqueous solution at temperatures between about 0° C. and 80° C., preferably between about 15° C. and 40° C.; at a pH value between about 9 and 14, and after the addition of phosgene, polycondensation is carried out by adding about 0.2 mol % to 10 mol %, relative to the molar amount of diphenol of a tertiary amine, the weight ratio of polyester-diol bis-diphenol carbonate to the other diphenol being determined by the proportion of polycarbonate and the proportion of polyester in the polyester/polycarbonates.

The present invention also relates to the polyester/polycarbonates obtained by this process.

The resulting solutions of the polyester/polycarbonates in the organic solvents are worked up analogously to the solutions of thermoplastic polycarbonates prepared by the two-phase interface process, with the polyester/polycarbonates also being subjected to an after-treatment; in particular they are either (a) isolated by known processes, for example by precipitating with methanol or ethanol, and then either dried and tempered, or subjected to shearing forces or dissolved in organic solvents and allowed to gel, or (b) already subjected to shearing forces during isolation, for example in a devolatilization extruder, or (c) allowed to gel, before isolation, in the solvent used in the preparation of the polyester/polycarbonates by the two-phase interface process.

Suitable inert organic solvents for the preparation process, according to the invention, of the polyester/polycarbonates are water-immiscible aliphatic chlorohydrocarbons, such as methylene chloride, chloroform and 1,2-dichloroethane, or chlorinated aromatic compounds, such as chlorobenzene, dichlorobenzene and chlorotoluene, or mixtures of these solvents.

Suitable alkaline aqueous solutions for the process according to the invntion are solutions of $Li(OH)_2$, NaOH, KOH, $Ca(OH)_2$ and/or $Ba(OH_2)$ in water.

Suitable tertiary aliphatic amines for the process according to the invention are those with about 3 to 15 C atoms, that is to say, for example, trimethylamine, triethylamine, n-tripropylamine and n-tributylamine, and varies between about 0.2-5 mol %, depending on the diphenol employed, and when tetramethyl substituted diphenols are employed, between about 5–10 mol %, in each case relative to the total amount of diphenols employed (=in each case to the sum of polyester-diol bis-diphenol carbonates and other diphenols).

The polyester/polycarbonates prepared by the process according to the invention can be isolated by the following processes:

a. By distilling off the organic solvent down to a certain concentration, a high-strength (about 30–40% by weight) polymer solution being obtained, the polyester/polycarbonate gels on subsequent slow evaporation of the remaining solvent.

b. By precipitating the polyester/polycarbonate from the organic phase using organic solvents, examples of suitable solvents for the precipitation being methanol, ethanol, isopropanol, acetone, aliphatic hydrocarbons and cycloaliphatic hydrocarbons.

c. By isolating the polyester/polycarbonates in a devolatilization extruder at temperatures of about 160°–240° C. under the conditions known for polycarbonate extrusion and applying shearing forces.

The polyester/polycarbonates prepared by the process according to the invention are gelled, either in the worked-up organic phase of the two-phase reaction mixture, without isolation, or in a separate solution of the previously isolated polyester/polycarbonates in organic solvents, by cooling the high-strength polymer solution, gelling times of between about 5 minutes and 12 hours being required at temperatures between about 0° C. and 40° C., depending on the proportion of polyester or polycarbonate.

The gelled product can be worked up to give a powder grain mixture, the resulting polyester/polycarbonate being dried in vacuo at 50° C. for about 48 hours and at 100° C. for about 24 hours.

Suitable solvents for the separate gelling of the isolated polyester/polycarbonates are organic solvents, such as, for example, methylene chloride, benzene, toluene or xylene.

The heat treatment of the isolated polyester/polycarbonates is carried out for between about 5 minutes and 24 hours at temperatures between about 40° C. and 170° C.

The isolated polyester/polycarbonates are subjected to the action of shearing forces for between about 0.5 and 30 minutes, at temperatures between about 130° and 240° C. and applying shearing forces of between about 0.2 and 0.7 KWh per kg of polymer.

The reaction, according to the invention, of the polyester-diol bis-diphenol carbonates according to the invention with diphenols and with phosgene by the two-phase interface process takes place quantitatively; the particular reactant ratio of polyester-diol bis-diphenol carbonate to the other diphenol is thus determined by the polycarbonate constituent and the polyester constituent of the polyester/polycarbonates to be synthesized in each case.

The proportion of polycarbonate in the polyester/polycarbonates prepared by the process according to the invention is between about 30 and 95, preferably between about 35 and 80% by weight, depending on the desired pattern of properties, the hardness and heat distortion point increasing and the elasticity and elongation at break decreasing with an increasing proportion of polycarbonate.

The proportion of polycarbonate in the polyester/polycarbonates according to the invention is to be understood as the amount by weight of aromatic polycarbonate structural units of the following formula V

(V)

wherein

D represents the diphenolate radicals in the polyester/polycarbonate, in particular of aromatic polycarbonate structural units of the formula IIIa

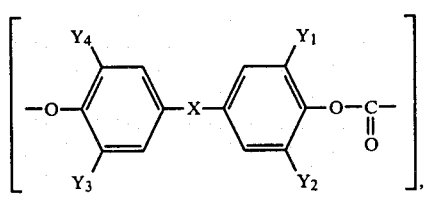
(IIIa)

wherein

X and $Y_1$ to $Y_4$ have the meaning given the formula III.

The polyester proportion of the polyester/polycarbonates according to the invention is accordingly to be understood as the amount by weight of polyester-diolate block units, of one of the polyester/diols described hereinabove of the simplified formula

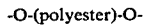

The present invention thus also relates to polyester/polycarbonates, which are characterized in that they consist of about 30 to 95% by weight, preferably about 35 to 80% by weight, of aromatic polycarbonate structural units of the formula V, in particular those of the formula IIIa, and of about 70 to 5% by weight, preferably of about 65 to about 20% by weight, of the polyester-diolate block units described above.

Polyester/polycarbonates according to the invention are, for example, those which consist of about 30 to about 95% by weight, preferably between about 35 and 80% by weight, of polycarbonate structural units of the formula IIIb

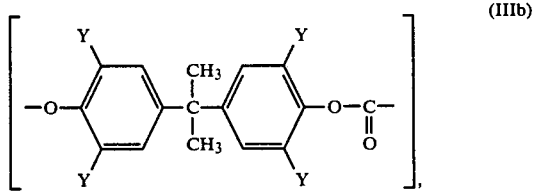
(IIIb)

wherein

Y is H, Cl, Br or $CH_3$, and of about 70 to about 5% by weight, preferably about 65 to about 20% by weight, of polyester-diolate block units.

The polyester/polycarbonates according to the invention should have average molecular weights $\overline{M}w$ (weight-average) of about 25,000 to 200,000, preferably of about 70,000 to 150,000, determined by the light scattering method using a scattered light photometer. The relative solution viscosities $\eta_{rel}$ (measured on 0.5 g in 100 ml of $CH_2Cl_2$ at 25° C.) of the polyester/polycarbonates according to the invention are between about 1.3 and 3.0, preferably between about 1.4 and 2.6.

The high-molecular, segmented polyester/polycarbonates which are prepared by the process according to the invention and can be processed as thermoplastics are characterized in that, measured by means of differential thermoanalysis, the polyester constituent is present in the amorphous form and has a transformation temperature between about $-100°$ C. and $+100°$ C., preferably between about $-80°$ C. and $+20°$ C., and in that the polycarbonate constituent is present in the partially crystalline form, the crystalline polycarbonate portion having a crystallite melting point of at least about 160° C., preferably between about 165° C. and 250° C., and in that the transformation temperature of the amorphous polycarbonate portion is above about 80° C., preferably above about 100° C.

This difference in the transformation temperature of the polyester constituent and the transformation temperature and crystallite melting point of the polycarbonate constituent is characteristic for the presence of the phase separation between the polyester constituent and the polycarbonate constituent.

The partial crystallinity of the polycarbonate constituent of the polyester/polycarbonates according to the invention, which can be detected by a measureable fusion enthalpy which is at least 1-8 cal/g of polymer, can be increased by a further 50% by stretching and by the subsequent heat treatment mentioned (5 minutes to 25 hours) at 40°–170° C., or by the action of shearing forces, which has been mentioned, during thermoplastic processing in a multiscrew extruder, whereupon the heat distortion point of the products rises and the appearance changes from transparent to opaque to intransparent.

The partially crystalline elastic polyester/polycarbonates can be processed as thermoplastics at temperatures from about 130° C. to a maximum of 250° C., in each case below or in the region of the crystallite melting point of the crystalline polycarbonate portion, whereupon a substantial proportion of the crystallinity is retained. Amorphous, transparent products are obtained at processing temperatures above the crystallite melting point of the crystalline polycarbonate portion.

The crystalline portion of the polycarbonate constituent of the polyester/polycarbonates according to the invention can thus be varied and, in order to give a high heat distortion point of the polyester/polycarbonates in practice, is sufficient to give an enthalpy of melting of about 1-8 cal/g of polymer, preferably about 2.5-5.5 cal/g of polymer.

If the polyester/polycarbonates are worked up and isolated according to the invention without heat treatment, without gelling and without the action of shearing forces, single-phase polyester/polycarbonates are obtained, that is to say those products which have only one transformation temperature which can be measured by means of differential thermoanalysis.

The stability of the polyester/polycarbonates according to the invention towards UV light and their stability towards hydrolysis can be improved by amounts of UV stabilizing agents customary for thermoplastic polycarbonates, such as, for example, substituted "benzophenones" or "benztriazoles" by agents which impart stability towards hydrolysis, such as, for example monocarbodiimides and, above all, polycarbodiimides (compare W. Neumann, J. Peter, H. Holtschmidt and W.

Kallert, Proceeding of the 4th Rubber Technology Conference, London, May 22-25, 1962, pages 738-751) in amounts of 0.2-5% by weight, relative to the weight of the polyester/polycarbonates, and by anti-ageing agents known in the chemistry of thermoplastic polyesters and thermoplastic polycarbonates.

Substances such as, for example, carbon black, kieselguhr, kaolin, clays, $CaF_2$, $CaCO_3$, aluminum oxides and customary glass fibers can be added in amounts of about 2 to 40% by weight, in each case relative to the total weight of the molding composition, and inorganic pigments, both as fillers and as nucleating agents, in order to modify the products according to the invention.

If flame-repellant products are desired, about 5 to 15% by weight, in each case relative to the weight of the polyester/polycarbonates, of flameproofing agents known in the chemistry of thermoplastic polyesters and thermoplastic polycarbonates, such as, for example, antimony trioxide, tetrabromophthalic anhydride, hexabromocyclododecane, tetrachloro- or tetrabromo-bisphenol A or tris-(2,3-dichloro-propyl) phosphate, can be admixed, the tetrachloro- and tetrabromo-bisphenols statistically incorporated into the polycarbonate portions of the polycarbonates according to the invention also exhibiting flame-repellant properties.

Furthermore, processing auxiliaries, such as mold release agents, known in the chemistry of thermoplastic polyesters and thermoplastic polycarbonates can be used effectively.

The polyester/polycarbonates obtained by the process according to the invention can be advantageously used in all instances where a combination of hardness and elasticity, in particular of cold flexibility, is desired, for example, in the construction of vehicle bodies, for the manufacture of low-pressure tires for vehicles, for sheating for hoses, sheets and tubes and for flexible drive pulleys.

The average molecular weights given in the Examples which follow are number-average $\overline{M}n$ and are ascertained by determining the OH number.

The relative solution viscosity $\eta_{rel}$ of Examples 7(a)-7(f) is defined as the viscosity of 0.5 g of polyester/polycarbonate in 100 ml of methylene chloride at 25° C.

The tensile strength and the elongation at break were measured according to DIN 53,455; the corresponding U.S. ASTM Equivalent is D-638. Investigations by gel chromatography were carried out in tetrahydrofurane using Styragel columns (separation range $1.5 \times 10^5$ Å, $1 \times 10^5$ Å, $3 \times 10^4$ Å and $2 \times 10^3$ Å) at room temperature. The calibration of bisphenol A polycarbonate was used for the determination. In comparison with the $\overline{M}w$ determination by the light-scattering method, no large deviations were found.

The differential thermoanalysis (DTA) was carried out with the "Dupont (E. I. du Pont de Nemours and Co.) Model 900" apparatus. For the interpretation of the transformation temperature, the approximate middle of the softening range, according to the tangent method, was chosen and for the crystallite melting point the approximate middle of the endothermic peak of the melting curve was chosen.

The Staudinger index $[\eta]$ given in Example 5 was measured in tetrahydrofurane at 25° C. and is given in dl/g. For the definition of the Staudinger index see: H. G. Elias: "Makromoleküle" (Macromolecules), Hüthig & Wepfverlag Basle, page 265.

EXAMPLE 5

Preparation of a polyester-diol bis-carbonic acid monoaryl ester 800 parts by weight of a polyester-diol, obtained from hexane-1,6-diol and adipic acid, of average molecular weight $\overline{M}n=800$, 856 parts by weight of diphenyl carbonate and 0.05 part by weight of sodium phenolate are heated to 150° C. for 3.5 hours under a vacuum of 15 mm Hg, while stirring and under nitrogen. During this time, 187 parts by weight of phenol are distilled off from the reaction mixture. The excess diphenyl carbonate is then removed in a thin film evaporator at 200° C./0.1 mm Hg. A colorless, viscous oil is obtained.

$[\eta]$ tetrahydrofurane=0.072
OH number=0
C: found 63.3%; calculated: 66.5%
H: found 8.3%; calculated: 8.2%

EXAMPLE 6a

Preparation of a polyester-diol bis-(bisphenol A) carbonate which also contains 18.5% by weight of bisphenol A and reaction products of bisphenol A and diphenyl carbonate 446.3 parts by weight (0.2 mol) of the bis-carbonic acid monoaryl ester, which has been prepared according to Example 5, of a polyester-diol, obtained from hexane-1,6-diol and adipic acid, of average molecular weight $\overline{M}n=1,900$, to which about 26.3 parts by weight of diphenyl carbonate have also been admixed (5.9% by weight residual content, relative to the total amount), 191.7 parts by weight of 2,2-bis-(4-hydroxyphenyl)-propane (bisphenol A) and 0.2 part by weight of catalyst (sodium bis-phenolate of bisphenol A to bisphenol A=1:100) are heated at 150° C. for 4 hours under 0.05 mm Hg, while stirring and under a nitrogen atmosphere. 57.3 parts by weight of phenol are distilled off during this time.

EXAMPLE 6b

Preparation of a polyester-diol bis-(bisphenol A) carbonate which also contains 18.7% by weight of bisphenol A and reaction products of bisphenol A and diphenyl carbonate 627 parts by weight of the bis-carbonic acid monoaryl ester, which has been prepared according to Example 5, of a polyester-diol, obtained from hexane-1,6-diol and adipic acid, of average molecular weight $\overline{M}_n=800$, and to which about 27.0 parts by weight of diphenyl carbonate have also been admixed (4.3% by weight residual content, relative to the total amount), 431.5 parts by weight of 2,2-bis-(4-hydroxyphenyl)-propane (bisphenol A) and 0.43 part by weight of catalyst (sodium bisphenolate of bisphenol A to bisphenol=1:100) are heated, while stirring and under a nitrogen atmosphere, first at 125° C. for 1 hour, then at 150° C. for 6 hours and under 0.5 mm Hg. 123 parts by weight of phenol are distilled off during this time.

EXAMPLE 6c

Preparation of a polyester-diol bis-(bisphenol A) carbonate which also contains 26.1% by weight of bisphenol A and reaction products of bisphenol A and diphenyl carbonate 1,870 parts by weight of the bis-carbonic acid monoaryl ester, which has been prepared according to Example 5, of a polyester-diol, obtained from adipic acid and a mixture of hexane-1,6-diol/neopentylglycol in the molar ratio 65/35, $\overline{M}_n=1,828$ and to which 164.5 parts by weight of diphenyl carbonate have also been admixed (8.8% by weight residual content, respectively to the total amount), 986 parts by weight of bisphenol A and 1.5 parts by weight of catalyst (sodium bisphenolate of bisphenol A to bisphenol 1:100) are heated, while stirring and under a nitrogen atmosphere, first at 125° C. for 1 hour and thereafter at 150° C. for 5 hours and under 0.25 mm Hg. 246 parts by weight of phenol are distilled off during this time.

EXAMPLE 6d

Preparation of a polyester-diol bis-(bisphenol A) carbonate which also contains 15.6% by weight of bisphenol A and reaction products of bisphenol A and diphenyl carbonate 313 parts by weight of the bis-carbonic acid monoaryl ester, which has been prepared according to Example 5, of a polyester-diol, obtained from adipic acid and a mixture of hexane-1,6-diol/neopentylglycol in the molar ratio 65/35, $\overline{M}_n=1,828$ and to which 12.8 parts by weight of diphenyl carbonate have also been admixed (4.1% by weight residual content, relative to the total amount), 120.5 parts by weight of 2,2-bis-(4-hydroxyphenyl)-propane (bisphenol A) and 0.02 part by weight of sodium phenolate are heated, while stirring and under a nitrogen atmosphere, at 125° C. for 1 hour and thereafter at 150° C. for 3 hours and under 0.06 mm Hg. 31.5 parts by weight of phenol are distilled off during this time.

EXAMPLE 6e

Preparation of a polyester-diol bis-(bisphenol A) carbonate which also contains 16.8% by weight of bisphenol A and reaction products of bisphenol A and diphenyl carbonate 348.1 parts by weight of the bis-carbonic acid monoaryl ester, which has been prepared according to Example 5, of a polyester-diol, obtained from adipic acid and neopentylglycol, of average molecular weight $\overline{M}_n=2,000$ and to which 18.1 parts by weight of diphenyl carbonate have also been admixed (5.2% by weight residual content, relative to the total amount), 139.5 parts by weight of 2,2-bis-(4-hydroxyphenyl)-propane (bisphenol A) and 0.14 part by weight of catalyst (sodium bisphenolate of bisphenol A to bisphenol A=1:100) are heated, while stirring and under a nitrogen atmosphere, first at 125° C. for 1 hour and thereafter at 150° C. for 5 hours and under 0.5 mm Hg. 37.6 parts by weight of phenol are distilled off during this time.

EXAMPLE 6f

Preparation of a polyester-diol bis-diphenyl carbonate of the formula IV f which also contains 2,2-bis-(3,5-dimethyl-4-hydroxyphenyl)-propane and reaction products of 2,2'-bis-(3,5-dimethyl-4-hydroxy-phenyl)-propane and diphenyl carbonate in amounts of 14.8% by weight 303 parts by weight of the bis-carbonic acid monoaryl ester, which has been prepared according to Example 5, of a polyester-diol, obtained from hexane-1,6-diol and adipic acid, of average molecular weight $\overline{M}_n=800$ and to which about 3 parts by weight of diphenyl carbonate have also been admixed (1% by weight residual content, relative to the total amount), 232.2 parts by weight of 2,2-bis-(3,5-dimethyl-4-hydroxyphenyl)propane and 0.22 part by weight of catalyst (sodium bisphenolate of bisphenol A: bisphenol A=1:100) are heated, while stirring and under a nitrogen atmosphere, first at 125° C. for 1 hour and thereafter at 150° C. for 4.5 hours and under 0.1 mm Hg. 49 parts by weight of phenol are distilled off during this time.

EXAMPLE 7a

Preparation of a polyester/polycarbonate with a polyester proportion of 50% by weight 151.5 parts by weight of this viscous oil from Example 6a, dissolved in 1,725 parts by weight of methylene chloride, are added to a solution of 40.2 parts by weight of bisphenol A and 0.885 part by weight of p-tert.-butylphenol in 70 parts by weight of 45 percent strength NaOH and 1,300 parts by weight of distilled water. 58.3 parts by weight of phosgene are passed in at 20°–25° C. in the course of 30 minutes, while stirring and under a nitrogen atmosphere. During the introduction, 111 parts by weight of 45 percent strength NaOH are simultaneously added dropwise so that the pH value remains constant at pH 13. After passing in the phosgene, 39.8 parts by weight of a 1 percent strength triethylamine solution are added and the mixture is stirred for 1 hour. The organic phase is separated off and washed successively with 2 percent strength phosphoric acid and finally with distilled water until free from electrolytes. After separating off the water, the organic phase can be worked up by the following processes:

7a.1 A high-strength (about 30–40% by weight) polymer solution is obtained by distilling off the CH$_2$Cl$_2$ down to a certain concentration or by adding chlorobenzene to the organic phase and distilling off the entire methylene chloride. The polyester/polycarbonate gels by subsequently slowly evaporating off the remaining methylene chloride or the chlorobenzene and can be further worked up to a powder grain mixture. The resulting polyester/polycarbonate is dried in vacuo at 50° C. for 48 hours and 100° C. for 24 hours.

7a.2 A finely divided solid product is obtained by distilling off the solvent, drying the residue in a vacuum drying cabinet at about 80°–110° C. under 15 mm Hg and subsequently grinding it.

7a.3 By precipitating the polyester/polycarbonate from the organic phase using, for example, methanol, ethanol, isopropanol, acetone, aliphatic hydrocarbons and cycloaliphatic hydrocarbons, and subsequently drying the precipitate in a vacuum drying cabinet at 80°–110° C. under 15 mm Hg.

7a.4 By concentrating the organic phase in an evaporation extruder and subsequent extrusion at about 160°–240° C. under the conditions which are known for polycarbonate extrusion.

The relative viscosity of the polyester/polycarbonate obtained according to 7a.1–7a.4 $\eta_{rel}$ is 1.46 (measured in CH$_2$Cl$_2$ at 25° C. and d=5 g/l). According to a determination by gel chromatography, the polyester/polycarbonate exhibits a maximum at 56,000. It contains 50% by weight of polyester and has a polycarbonate proportion of 50% by weight. Some mechanical properties of a film cast out of methylene chloride are:

Tensile strength 22.7 (MPa) (measured according to DIN 53,455-ASTM D-638).

Elongation at break 413% (measured according to DIN 53,455-ASTM D-638).

According to differential thermoanalysis of the granular polyester/polycarbonate, the polyester constituent has a glass transition temperature (transformation temperature) of −28° C., the amorphous polycarbonate portion has a glass transition temperature (transformation temperature) of 125° C. and the crystalline polycarbonate portion has a crystallite melting point of about 190° C. The fusion enthalpy of the crystalline polycarbonate portion is between 2.5 and 5.5 cal/g of polymer.

EXAMPLE 7b

Preparation of a polyester/polycarbonate with a polyester proportion of 45% by weight 171.6 parts by weight of the viscous oil from Example 6b, dissolved in 1,725 parts by weight of methylene chloride, are added to a solution of 20.3 parts by weight of 2,2-bis-(4-hydroxyphenyl)-propane (bisphenol A) and 1.3 parts by weight of p-tert.-butylphenol in 1,300 parts by weight of distilled water and 77 parts by weight of 45 percent strength sodium hydroxide solution. 85.6 parts by weight of phosgene are passed into the mixture in the course of 45 minutes, while stirring and under a nitrogen atmosphere, 195 parts by weight of 45 percent strength sodium hydroxide solution being simultaneously added dropwise in order to keep the pH constant at 13. After passing in the phosgene, 0.44 part by weight of triethylamine is added. The mixture becomes more viscous. After 1 hour, the organic phase is separated off and the polyester/polycarbonate is isolated as described in Example 7a (working up 7a.1–7a.4).

The relative viscosity of the polyester/polycarbonate $\eta_{rel}$ is 1.82 (in $CH_2Cl_2$).

According to a determination by gel chromatography, the polymer exhibits a maximum at 93,000.

The mechanical properties of a film, cast out of methylene chloride, containing 45% by weight of polyester and having a polycarbonate proportion of 55% by weight, are:
Tensile strength: 61.5 MPa
Elongation at break: 265%

EXAMPLE 7c

Preparation of a polyester/polycarbonate with a polyester proportion of 50% by weight 163.2 parts by weight of the viscous oil from Example 6c, dissolved in 1,725 parts by weight of methylene chloride, are added to a solution of 28.5 parts by weight of 2,2-bis-(4-hydroxyphenyl)-propane (bisphenol A) and 0.89 part by weight of p-tert.-butylphenol in 1,300 parts by weight of distilled water and 70 parts by weight of 45 percent strength sodium hydroxide solution. 58.3 parts by weight of phosgene are passed into the mixture in the course of 40 minutes, while stirring and under a nitrogen atmosphere, 131 parts by weight of 45 percent strength sodium hydroxide solution being simultaneously added dropwise in order to keep the pH constant at 13. After passing in the phosgene, 0.4 part by weight of triethylamine is added. The mixture becomes more viscous. After 1 hour, the organic phase is separated off and the polyester/polycarbonate is isolated as described in Example 7a (working up 7a.1–7a.4).

The relative viscosity of the polyester/polycarbonate $\eta_{rel}$ is 1.62 (in $CH_2Cl_2$).

According to a determination by gel chromatography, the polymer exhibits a maximum at 51,000.

The mechanical properties of a film, cast out of methylene chloride, containing 50% by weight of polyester and having a polycarbonate proportion of 50% by weight, are:
Tensile strength: 17.8 MPa
Elongation at break: 293%

According to differential thermoanalysis of the granular polyester/polycarbonate, the polyester constituent has a glass transition temperature (transformation temperature) of −24° C., the amorphous polycarbonate portion has a glass transition temperature (transformation temperature) of 130° C. and the crystalline polycarbonate portion has a crystallite melting point of about 185° C. The fusion enthalpy of the crystalline polycarbonate portion is between 2.5 and 5.5 cal/g of polymer.

EXAMPLE 7d

Preparation of a branched polyester/polycarbonate with a polyester proportion of 45% by weight 130.6 parts by weight of the viscous oil from Example 6d, dissolved in 1,725 parts by weight of methylene chloride, are added to a solution of 59.8 parts by weight of 2,2-bis-(4-hydroxyphenyl)-propane (bisphenol A) and 0.98 part by weight of p-tert.-butylphenol in 1,300 parts by weight of distilled water and 77 parts by weight of 45 percent strength sodium hydroxide solution. A solution of 0.58 part by weight of 1,4-bis-(4',4"-dihydroxytriphenylmethyl)benzene and 5 parts by weight of 5 percent strength sodium hydroxide solution is added to this. 64.3 parts by weight of phosgene are passed into the mixture in the course of 30 minutes, while stirring and under a nitrogen atmosphere, 146 parts by weight of 45 percent strength sodium hydroxide solution being simultaneously added dropwise in order to keep the pH constant at 13. After passing in the phosgene, 0.44 part by weight of triethylamine is added. The mixture becomes more viscous. After 1 hour, the organic phase is separated off and the polyester/polycarbonate is isolated as described in Example 7a, (working up 7a.1–7a.4).

The relative viscosity of the polyester/polycarbonate $\eta_{rel}$ is 1.81 (in $CH_2Cl_2$).

According to a determination by gel chromatography, the polymer exhibits a maximum at 53,000 and a high-molecular additional maximum at 200,000.

The mechanical properties of a film, cast out of methylene chloride, containing 45% by weight of polyester and having a polycarbonate proportion of 55% by weight, are
Tensile strength: 39.6 MPa
Elongation at break: 286%

According to differential thermoanalysis of the granular polyester/polycarbonate, the polyester constituent has a glass transition temperature (transformation temperature) of −28° C., the amorphous polycarbonate portion has a glass transition temperature (transformation temperature) of 130° C. and the crystalline polycarbonate portion has a crystallite melting point of about 185° C. The fusion enthalpy of the crystalline polycarbonate portion is between 2.5 and 5.5 cal/g of polymer.

EXAMPLE 7e

Preparation of a polyester/polycarbonate with a polyester proportion of 50% by weight 149.2 parts by weight of the oil from Example 6e, dissolved in 1,725 parts by weight of methylene chloride, are added to a solution of 42.4 parts by weight of bisphenol A and 0.89 part by weight of p-tert.-butylphenol in 1,300 parts by weight of distilled water and 70 parts by weight of 45 percent strength sodium hydroxide solution. 58.3 parts by weight of phosgene are passed into the mixture in the course of 40 minutes, while stirring and under a nitrogen atmosphere, 135 parts by weight of 45 percent strength sodium hydroxide solution being simultaneously added dropwise in order to keep the pH constant at 13. After passing in the phosgene, 0.4 part by weight of triethylamine is added. The mixture becomes more viscous. After 1 hour, the organic phase is separated off and the polyester/polycarbonate is isolated as described in Example 7a (working up 7a.1–7a.4).

The relative viscosity of the polyester/polycarbonate $\eta_{rel}$ is 1.56 (in $CH_2Cl_2$).

According to a determination by gel chromatography, the polymer exhibits a maximum at 49,000.

The mechanical properties of a film, cast out of methylene chloride, containing 50% by weight of polyester and having a polycarbonate proportion of 50% by weight, are:

Tensile strength: 17.5 MPa
Elongation at break: 228%

According to differential thermoanalysis of the granular polyester/polycarbonate, the polyester constituent has a glass transition temperature (transformation temperature) of $-19°$ C., the amorphous polycarbonate portion has a glass transition temperature (transformation temperature) of 125° C. and the crystalline polycarbonate portion has a crystallite melting point of about 185° C. The fusion enthalpy of the crystalline polycarbonate portion is between 2.5 and 5.5 cal/g of polymer.

EXAMPLE 7f

Preparation of a polyester/polycarbonate from 2,2-bis-(3,5-dimethyl-4-hydroxyphenyl)-propane with a polyester proportion of 49% by weight 197.1 parts by weight of the viscous oil from Example 6f and 0.61 part by weight of tributylamine (=1 mol % per mol of bisphenol units), dissolved in 1,725 parts by weight of methylene chloride, are added to a solution of 66 parts by weight of 45 percent strength sodium hydroxide solution and 1,300 parts by weight of distilled water. 98 parts by weight of phosgene are passed into the mixture in the course of 30 minutes, while stirring and under a nitrogen atmosphere, 225 parts by weight of 45 percent strength sodium hydroxide solution being simultaneously added dropwise in order to keep the pH constant at 13. After passing in the phosgene, 5.5 parts by weight of tributylamine (=9 mol % per mol of bisphenol units) are added in order to bring the condensation reaction to completion. The mixture becomes more viscous. After 3 hours, the organic phase is separated off and the polyester/polycarbonate is recovered as described in Example 7a (working up 7a.1).

The relative viscosity of the polyester/polycarbonate $\eta_{rel}$ is 1.58 (in $CH_2Cl_2$).

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polyester-diol bis-diphenol carbonate comprising:
   (1) heating a polyester-polyol having a molecular weight $\overline{M}_n$ (number-average) of over 250 with a carbonic acid bis-aryl ester
      (a) at a temperature between about 100° C. and about 200° C.,
      (b) in vacuo below about 35 mm Hg, and
      (c) in the presence of a catalyst,
   characterized in that more than 1 mol of carbonic acid bis-aryl ester is employed per mol of OH-groups of the polyester polyol, and
   (2) heating the resulting polyester-diol bis-carbonic acid monoaryl ester with a diphenol
      (a) at a temperature between about 100° C. and about 200° C.,
      (b) in vacuo below about 35 mm Hg, and
      (c) in the presence of a catalyst,
   characterized in that more than 1 mol of diphenol is employed per mol of carbonic acid aryl ester groups of the polyester-diol bis-carbonic acid monoaryl ester.

2. The process according to claim 1, wherein the resulting polyester diol bis-carbonic ester monoaryl ester and excess carbonic acid bis-aryl ester are reacted with a diphenol.

3. A process for the preparation of a polyester-diol bis-diphenol carbonate comprising
   (i) heating a compound of the general formula

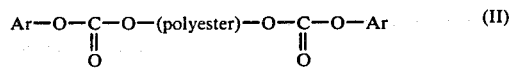

wherein Ar is a substituted or unsubstituted aryl radical having 6 to 18 carbon atoms, "-(polyester)-" is a bivalent radical of a polyester-diol having a molecular weight Mn greater than 250, with a diphenol at a temperature between about 100° C. and about 200° C. in vacuo below about 35 mm Hg in the presence of a catalyst, characterized in that more than 1 mol of diphenol is employed per mol of carbonic acid aryl ester groups of the polyester-diol bis-carbonic acid monoaryl ester
   (ii) distilling-off the resulting hydroxyaryl by-product.

4. The process according to either claim 1 or 3, wherein the molecular weight of the polyester polyol is over 600.

5. The process according to either claim 1 or 3, wherein the reaction temperature is between about 110° C. and 180° C.

6. The process according to claim 3, wherein the pressure is between about 25 mm and 0.1 mm Hg.

7. The process according to either claim 1 or 3, wherein the amount of diphenol is between about 1.1 and about 2 mols per carbonic acid aryl ester group of the polyester-diol biscarbonic acid monoaryl ester.

8. The process according to either claim 1 or 3 wherein the diphenol has the general formula

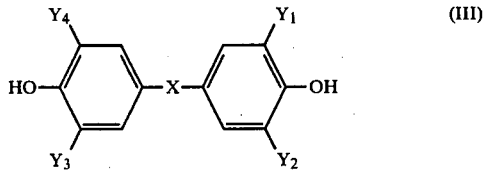

wherein X denotes $-CH_2-$,

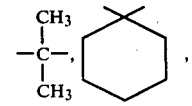

O, S or SO₂,
and Y₁ to Y₄ are identical or different and denote hydrogen or halogen.

9. The process according to either claim 1 or 3 when carried out in the absence of a solvent.

10. The process according to either claim 1 or 3 when carried out in the presence of an inert solvent.

11. The process according to either claim 1 or 3 wherein a polyester-diol bis-carbonic acid monoaryl ester, is reacted with bisphenol-A (a) in a molar ratio of bis-carbonic acid monoaryl ester to bisphenol-A of about 1:3,

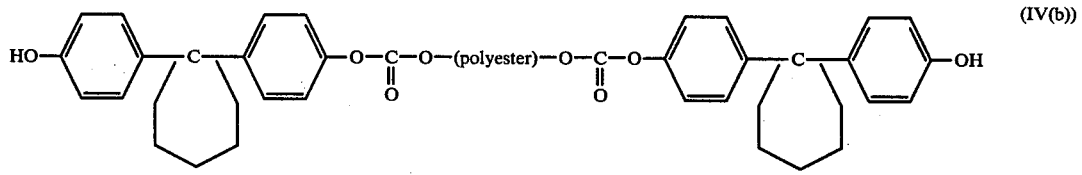

(b) in the presence of the disodium phenolate of bisphenol-A as the catalyst,
(c) at a temperature of about 150°,
(d) in vacuo between about 25 mm and 0.1 mm Hg.

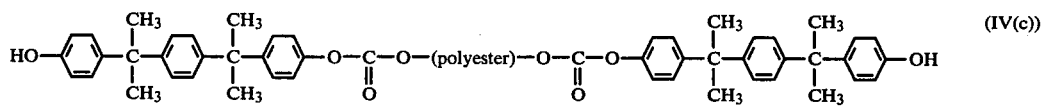

12. A polyester-diol bis-diphenyl carbonate, prepared by the process according to either claim 1 or 3.

13. A polyester-diol bis-diphenol carbonate of the formula

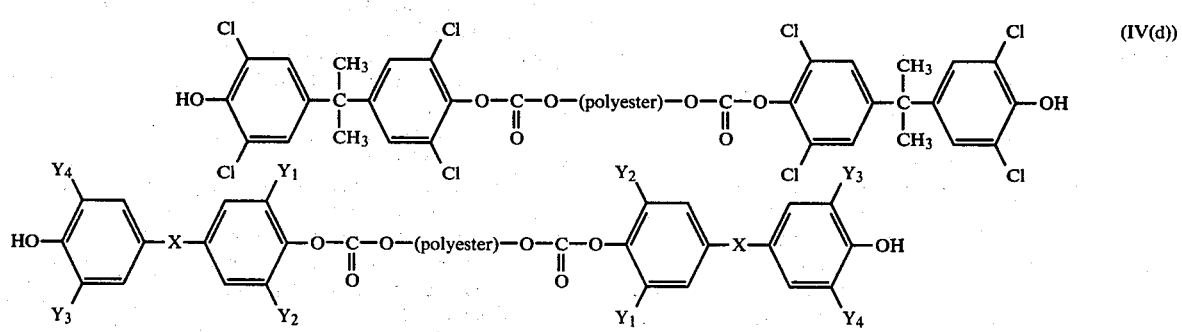

wherein -(polyester)- represents the bivalent radical of a polyester-diol,
X denotes —CH₂—,

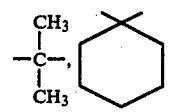

O, S or SO₂,
and Y₁ to Y₄ are identical or different and denote hydrogen or halogen.

14. A polyester-diol bis-diphenol carbonate of the formula (IV(a))

wherein -(polyester)- represents the bivalent radical of a polyester-diol.

15. A polyester-diol bis-diphenol carbonate of the formula (IV(b))

wherein -(polyester)- represents the bivalent radical of a polyester-diol.

16. A polyester-diol bis-diphenol carbonate of the formula

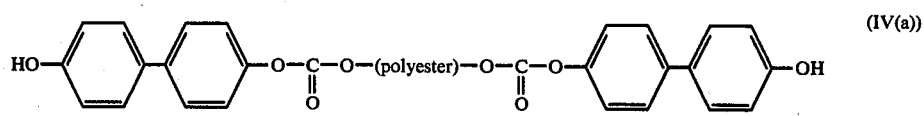

(IV(c))

wherein -(polyester)- represents the bivalent radical of a polyester-diol.

17. A polyester-diol bis-diphenol carbonate of the formula (IV(d))

wherein -(polyester)- represents the bivalent radical of a polyester-diol.

18. A polyester-diol bis-diphenol carbonate of the formula

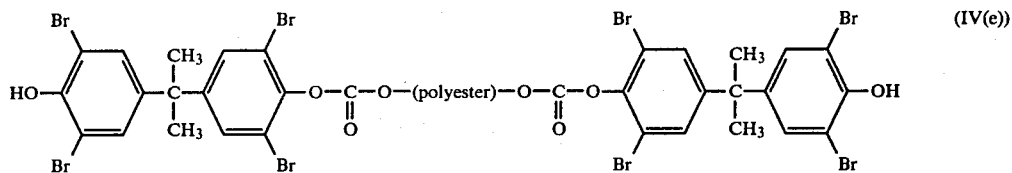

wherein -(polyester)- represents the bivalent radical of a polyester-diol.

19. A polyester-diol bis-diphenol carbonate of the formula

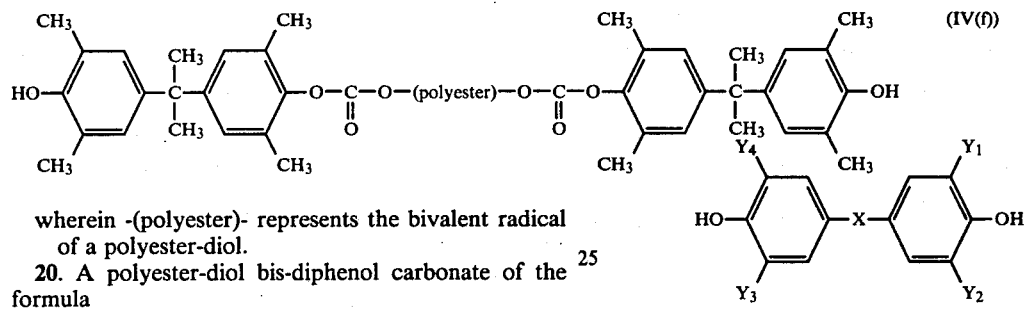

wherein -(polyester)- represents the bivalent radical of a polyester-diol.

20. A polyester-diol bis-diphenol carbonate of the formula

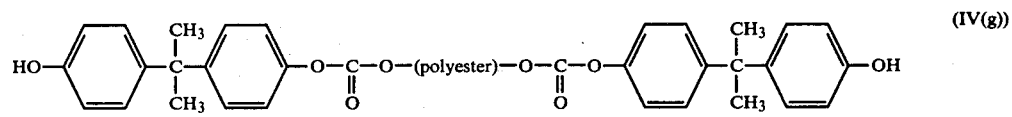

wherein -(polyester)- represents the bivalent radical of a polyester-diol.

21. A polyester-diol bis-diphenol carbonate of the formula

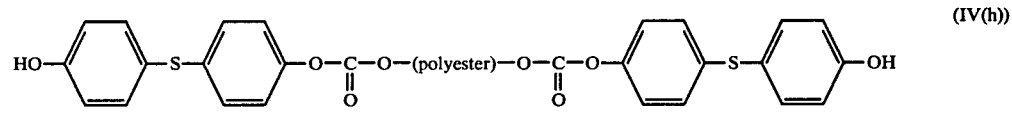

wherein -(polyester)- represents the bivalent radical of a polyester-diol.

22. A process for the preparation of a polyester/polycarbonate, comprising reacting a polyester-diol bis-diphenol carbonate prepared by the process according to either claim 1 or 3 with a diphenol and phosgene in a liquid mixture comprising an inert organic solvent and an alkaline aqueous solution, at a temperature of between about 0° C. and 80° C. at a pH value between about 9 and 14, wherein after the addition of phosgene, polycondensation is carried out by adding from about 0.2 mol % to about 10 mol %, relative to the molar amount of diphenol, of a tertiary amine, the weight ratio of polyester-diol bis-diphenol carbonate to the diphenol being determined by the desired proportion of polycarbonate and the proportion of polyester in the resulting polyester/polycarbonate.

23. The process according to claim 22, wherein the diphenol has the general formula (III)

$$\text{HO} \bigcirc{Y_4 \atop Y_3} - X - \bigcirc{Y_1 \atop Y_2} \text{OH}$$

wherein

X denotes —CH$_2$—,

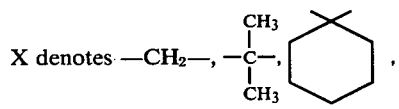

O, S or SO$_2$ and

Y$_1$ to Y$_4$ are identical or different and denote hydrogen or halogen.

24. The process according to claim 22, wherein the tertiary amine has from about 3 to about 15 C atoms per amine molecule.

25. The process according to claim 22, wherein between about 0.05 and about 2 mol % of trifunctional or more than trifunctional compounds are employed.

26. The process according to claim 22, further comprising using polyester-monool mono-diphenol carbonates as reactants in molar amounts of up to about 50 mol %, relative to the mols of polyester-diol bis-diphenol carbonates employed.

27. The process according to claim 22, wherein the polyester/polycarbonates are subjected to gelling, shearing or heat treatment in the course of isolation whereby the recovered polymer is multi-phase.

28. The process according to claim 22, wherein the polyester/polycarbonates are not subjected to gelling, shearing or heat treatment in the course of isolation whereby the recovered polymer is single phase.

29. A polyester/polycarbonate prepared by the process according to claim 22.

30. A polyester/polycarbonate comprising from about 30 to about 95% by weight of aromatic polycarbonate structural units of the formula

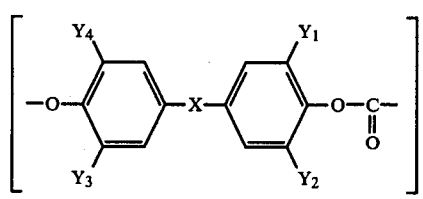
(III(a))

wherein
X denotes —CH$_2$—,

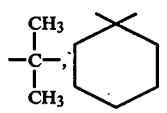

O, S or SO$_2$, and

Y$_1$ to Y$_4$ are identical or different and denote hydrogen or halogen, and from about 70 to about 5% by weight of polyester-diolate block units of the simplified formula

[—O—(polyester)—O—]

wherein

-(polyester)- represents the bivalent radical of a polyester-diol.

31. A polyester/polycarbonate comprising from about 35 to about 80% by weight of structural units of the formula

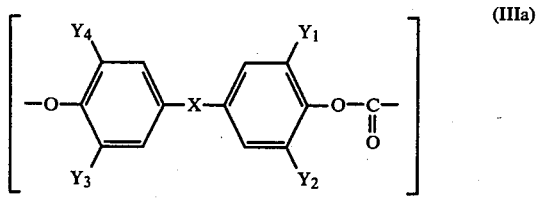
(IIIa)

and from about 65 to about 20% by weight of the polyester-diolate block units of the simplified formula

[—O—(polyester)—O—]

wherein -(polyester)- represents the bivalent radical of a polyester-diol.

32. The polyester/polycarbonate according to either claim 30 or 31, wherein the average molecular weight $\overline{M}_w$ (weight-average) of the resultant polyester/polycarbonate is between about 25,000 and about 200,000.

33. The polyester/polycarbonate according to claim 30 wherein the aromatic polycarbonate structural units have the formula

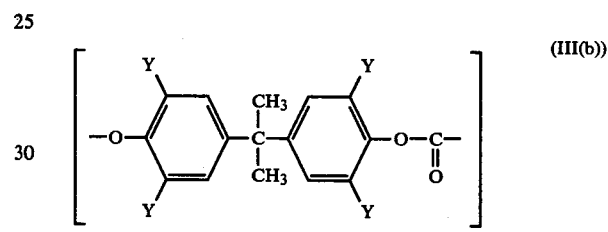
(III(b))

wherein
Y is H, Cl, Br or CH$_3$.

34. A process for the thermoplastic processing of a polyester/polycarbonate according to either claim 30 or 31 wherein the thermoplastic processing is carried out below or in the region of the crystallite melting point of the crystalline portion of polycarbonate at a temperature between about 130° and about 250° C.

35. Articles made by the process according to claim 34.

36. A process for the thermoplastic processing of a polyester/polycarbonate according to claim 29 wherein the thermoplastic processing is carried out below or in the region of the crystallite melting point of the crystalline portion of polycarbonate at a temperature between about 130° and about 250° C.

37. Articles made by the process according to claim 36.

* * * * *